United States Patent
Hirunuma et al.

(10) Patent No.: US 6,768,587 B2
(45) Date of Patent: Jul. 27, 2004

(54) TREMBLE CORRECTING DEVICE AND OPTICAL DEVICE PROVIDED WITH TREMBLE CORRECTING FUNCTION

(75) Inventors: Ken Hirunuma, Tokyo (JP); Koji Tsuda, Tokyo (JP)

(73) Assignee: PENTAX Corporation, Tokyo (JP)

( * ) Notice: Subject to any disclaimer, the term of this patent is extended or adjusted under 35 U.S.C. 154(b) by 193 days.

(21) Appl. No.: 10/028,444

(22) Filed: Dec. 28, 2001

(65) Prior Publication Data

US 2002/0089749 A1 Jul. 11, 2002

(30) Foreign Application Priority Data

Jan. 11, 2001 (JP) ..................................... P2001-003609

(51) Int. Cl.⁷ .......................... G02B 27/64; G02B 23/00
(52) U.S. Cl. ...................... 359/554; 359/557; 359/425; 396/52
(58) Field of Search ................................ 359/554–557, 359/694–706, 407–431, 399; 396/52–55; 368/208

(56) References Cited

U.S. PATENT DOCUMENTS

| | | | | |
|---|---|---|---|---|
| 5,305,040 A | * | 4/1994 | Enomoto ...................... | 396/55 |
| 5,619,735 A | * | 4/1997 | Kai .............................. | 396/55 |
| 5,774,266 A | * | 6/1998 | Otani et al. .................. | 359/554 |
| 5,881,325 A | * | 3/1999 | Imura et al. .................. | 396/55 |
| 5,986,826 A | * | 11/1999 | Kosaka et al. ............... | 359/814 |
| 5,995,762 A | * | 11/1999 | Enomoto et al. ............. | 396/55 |
| 6,043,934 A | * | 3/2000 | Hirunuma et al. ........... | 359/557 |
| 6,225,613 B1 | | 5/2001 | Tsukamoto et al. .......... | 250/201.2 |
| 6,252,713 B1 | | 6/2001 | Hirunuma et al. ........... | 359/557 |
| 6,266,190 B1 | | 7/2001 | Hirunuma et al. ........... | 359/557 |

FOREIGN PATENT DOCUMENTS

JP          2000199862          7/2000

OTHER PUBLICATIONS

English Language Abstract of JP 2000–199862.

* cited by examiner

Primary Examiner—Thong Q. Nguyen
(74) Attorney, Agent, or Firm—Greenblum & Bernstein, P.L.C.

(57) ABSTRACT

A first frame holds a second frame which holds two correction lenses. Two guide pins, fixed on the first frame, pierce through two guide holes extending in a lengthwise direction. A first actuator including a motor and a shaft moved in the lengthwise direction in accordance with the rotation of the motor moves the first frame in the lengthwise direction. One of the guide pins is in contact with one end of the shaft. The tip end of a pressing member mounted on another of the guide pins is in point-contact with another end surface of the shaft, pressing the shaft to the another guide pin. In accordance with the movement of the shaft, the first frame moves in the lengthwise direction being guided by the guide pins and holes. A second actuator for moving the second frame in the lateral direction is structured similarly.

9 Claims, 11 Drawing Sheets

TREMBLE CORRECTING DEVICE AND OPTICAL DEVICE PROVIDED WITH TREMBLE CORRECTING FUNCTION

BACKGROUND OF THE INVENTION

1. Field of the Invention

This invention relates to an optical device, for example, binoculars, and especially relates to a correcting mechanism which corrects a tremble of a focused image using correction optical systems.

2. Description of the Related Art

Conventionally, some binoculars, provided with a tremble correcting function which corrects a tremble of a focused image due to a hand tremble, are known. For example, in Japanese Patent Publication No. P2000-199862, a focused image tremble correcting device is disclosed. The device moves correction optical systems in two directions crossing at right angles on a plane perpendicular to the optical axes of the correction optical systems such that the focused image tremble is canceled.

In the device, the correction optical systems are held by a lateral-direction driving frame, and the lateral-direction driving frame is supported in an opening portion of the lengthwise-direction driving frame. Further, the device includes two direct-drive-actuators which move the driving frames. Each of the actuators has a motor and a shaft which converts a rotational movement of the motor to a liner movement using a lead screw. The lateral-direction actuator is supported by the lengthwise-direction driving frame.

Now, the movement of the correction optical systems in the lengthwise direction will be explained. The shaft of the lengthwise-direction direct-drive actuator extends in the lengthwise direction which approximately coincides with the vertical direction when the optical device is used in a usual position. The tip end of the shaft is abutted against a guide pin which is unitarily provided at a lower side of the frame. The frame is pulled upward by a coil spring, so that the guide pin is pressed against the tip end of the shaft from the lower side.

Accordingly, the guide pin and the frame are moved in the lengthwise direction in accordance with the movement of the shaft. The driving force of the shaft caused by the motor is set to a value which is necessary to press the lengthwise-direction driving frame downward. Namely, the driving force is set to a value obtained by subtracting the gravity of the lengthwise-direction driving frame, the lateral-direction driving frame, the lateral-direction actuator, and the correction optical systems, from the pulling force of the coil spring.

As described above, the pulling force of the coil spring is directed in the upward vertical direction, when the optical device is used in the usual position. However, as the direction of the pulling force varies in accordance with user's holding way and pose, the direction of the pulling force does not always coincide with the upward vertical direction. For example, when the optical device is held upside down, the pulling force is directed in the downward vertical direction. Accordingly, the pulling force and the above-mentioned gravity act on the shaft, and the total force acting on the shaft becomes larger than the driving force of the shaft, so that there is the possibility that the motor might pull out.

SUMMARY OF THE INVENTION

Therefore, an object of the present invention is to prevent the motor from pulling out due to the position of the optical device, and to keep the shaft in a precise portion of the driving frame.

In accordance with an aspect of the present invention, there is provided a device for correcting tremble of a focused image comprising: a correction optical system for correcting a tremble of an optical axis of an optical device; a driving frame, holding the correction optical system, that can be moved in a predetermined direction on a plane perpendicular to the optical axis; a driving mechanism that includes a shaft, the central axis of which is parallel to the predetermined direction, and that drives linearly the shaft along the central axis; and a transmitting mechanism that transmits the linear movement of the shaft to the driving frame by supporting the shaft at the both ends of the shaft.

Accordingly, the linear movement of the shaft is transmitted to the driving frame. Therefore, no matter how the optical device is held, the driving mechanism, for example, a motor, is prevented from being pulled out and not working well due to an added load.

Preferably, the predetermined direction corresponds to the vertical direction when the optical device is held in a usual manner. Even if the position of the optical device is upside down, the driving frame can be accurately driven.

Preferably, the transmitting mechanism includes: two projecting portions that project from the driving frame along the optical axis so as to respectively face the corresponding ends of the shaft; and a pressing member, provided on at least one of the projecting portions, that supports the shaft at both ends of the shaft with another of the projecting portions.

Further, the projecting portions may work as a guide member which guide the driving frame in a predetermined direction or the moving direction of the driving frame. To put it concretely, two guide holes, the longitudinal axis of which extends in the predetermined direction, are provided in the optical device, and the projecting portions are respectively moved in the two guide holes, whereby the driving frame is moved, being guided in the predetermined direction.

Optionally, the driving mechanism may include a screw feeder mechanism that transmits the rotation of the motor to said shaft. Preferably, the ends of the shaft are in point-contact with the transmitting mechanism when the shaft linearly moves rotating by the screw feeder mechanism. Accordingly, a friction between the shaft and the transmitting mechanism is lowered, and a load added to the motor is reduced.

For example, the pressing member, which supports the shaft at both ends of the shaft with the projecting portions, includes: a case that is fixed on one of the projecting portions; a press pin that can be moved along the central axis of the shaft against the case; and a coil spring provided in the case, that urges the press pin along the central axis of the shaft. The tip end of the press pin is spherical and in contact with one end of the shaft at all times.

Further, optionally, the pressing member may be a set screw fixed on one of the projecting portions. A tip end of the set screw is formed spherical, and is in point-contact with one end of the shaft, so that the tip end presses the shaft along the axis of the shaft.

Furthermore, optionally, the pressing member may be a plunger fixed on the projecting portion. The plunger includes: a ball that is provided at a tip end of the plunger; a coil spring that urges the ball along the axis of the shaft.

Optionally, one of the end portions of the shaft is formed spherical, a plane portion perpendicular to the axis of the shaft is formed on the projecting portion, and the end portion is in contact with the plane portion at all times.

In accordance with another aspect of the present invention, there is provided an optical device comprising a correction mechanism for a tremble of a focused image. The correction mechanism corrects a tremble of an optical axis of the optical device by moving a correction optical system in a first and a second directions which cross at right angle on a plane perpendicular to an optical axis of the correction optical system. The correction mechanism comprises: a first driving frame which can be moved in the first direction, and on which an opening portion is formed; a first driving mechanism which includes a first shaft parallel to the first direction and which moves linearly the first shaft along its axis; a first transmitting mechanism which supports the first shaft at both ends of the first shaft, being fixed on the first driving frame, whereby a linear movement of the first shaft is transmitted to the first driving frame; a second driving frame which can be moved in the second direction and which holds the correction optical system; a second driving mechanism which includes a second shaft parallel to the second direction and which moves linearly the second shaft along its axis; and a second transmitting mechanism which supports the second shaft at both ends of the second shaft, being fixed on the second driving frame, whereby a linear movement of the second shaft is transmitted to the second driving frame. The second driving frame, the second driving mechanism, and the second transmitting mechanism are supported by the first driving frame.

BRIEF DESCRIPTION OF THE DRAWINGS

The objects of the present invention will be better understood from the following description, with reference to the accompanying drawings, in which.

DESCRIPTION OF THE PREFERRED EMBODIMENTS

Figure 1:
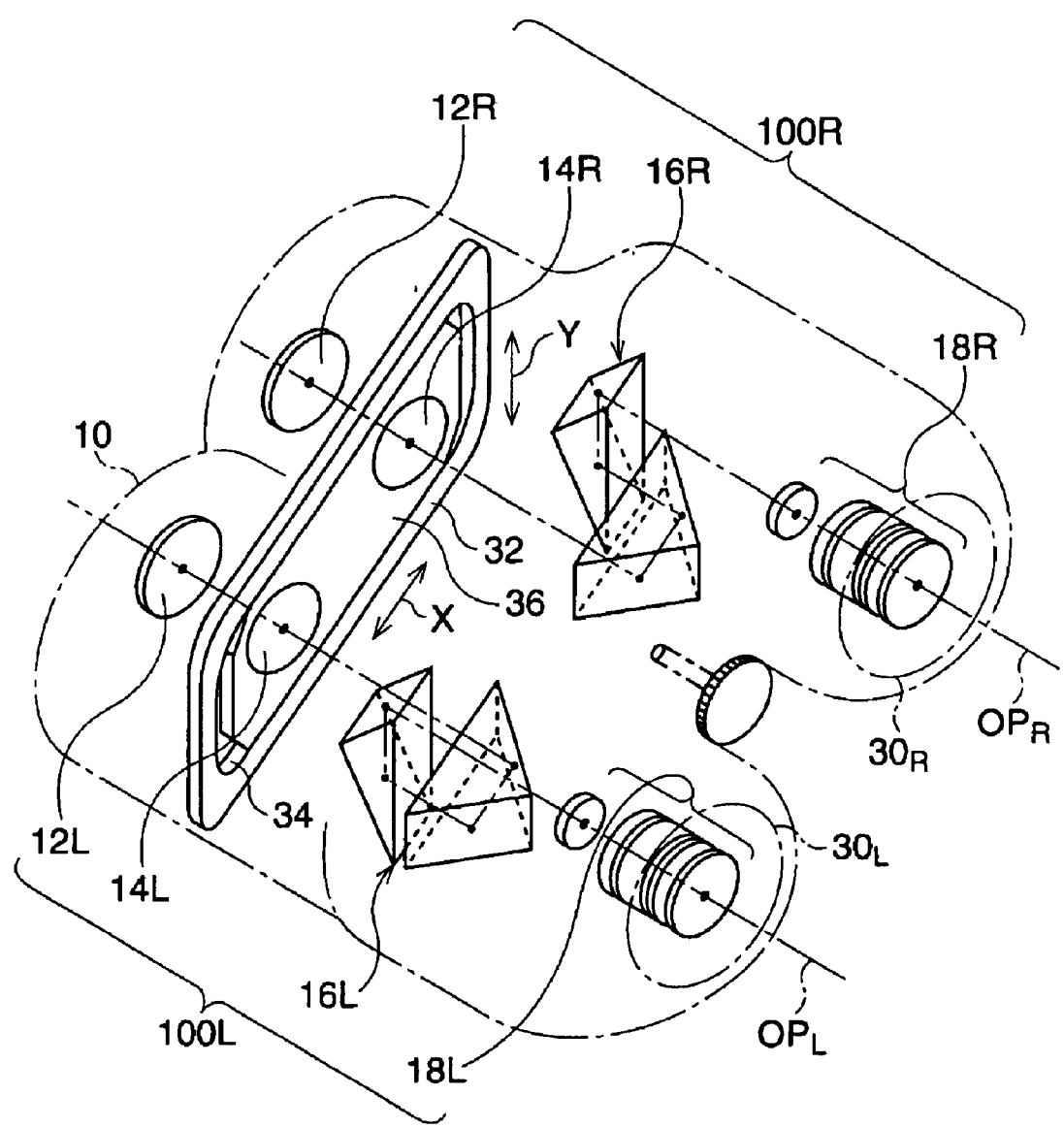
FIG. 1 shows an optical device provided with a focused image tremble correcting function, to which a first embodiment according to the present invention is applied.

FIG. 1 shows an optical device (binoculars) provided with a focused image tremble correcting function, to which a first embodiment according to the present invention is applied. FIG. 1 is a perspective view which briefly indicates a positional relationship among the optical systems of the binoculars. The binoculars include two optical systems corresponding to human eyes, in a body 10 indicated by a broken line. One optical system is a first optical system 100R for a right eye, and another optical system is a second optical system 100L for a left eye.

In the first optical system 100R, a luminous flux, which is incident on an objective lens 12R, passes through a correction lens (correction optical system) 14R, and is reflected by a Porro prism erecting system 16R which includes two Porro prisms, and is led to an eyepiece 18R which includes a plurality of optical elements. The second optical system 100L has a structure similar to that of the first optical system 100R. In the second optical system 100L, each element has the reference numeral in which "R" of the reference numeral of the corresponding element of the first optical system 100R is changed to "L". As the first and second optical systems 100R and 100L have the above-mentioned structure, an object can be viewed through two eyepiece portions 30R and 30L.

The optical axes $OP_R$ and $OP_L$ of the first and second optical systems 100R and 100L are indicated by broken lines, in FIG. 1. As shown in FIG. 1, the optical axes $OP_R$ and $OP_L$ are situated at predetermined intervals and parallel to each other.

Two correction lenses 14R and 14L are unitarily held by a second driving frame or a lateral-direction driving frame 36, which is plate-shaped. Further, the lateral-direction driving frame 36 is held in an opening portion 34 formed in a first driving frame or a lengthwise-direction driving frame 32. The opening portion 34 has a rectangular-shape. The frame 36 can be moved only in the lateral direction (a second direction) which is indicated by the arrow X, in the opening portion 34. The frame 32 can be moved with the frame 36 only in the lengthwise direction (a first direction) which is indicated by the arrow Y.

Note that, the lateral direction is defined as a direction which is parallel to a plane including the optical axes $OP_R$ and $OP_L$ and is perpendicular to the optical axes $OP_R$ and $OP_L$. Further, the lengthwise direction is defined as a direction which is perpendicular to the optical axes $OP_R$, $OP_L$, and the plane including the optical axes $OP_R$, $OP_L$.

Other optical systems 12R, 16R, 18R, 12L, 16L, and 18L are fixed at predetermined portions in the body 10. On the other hand, the correction lenses 14R and 14L can be moved together in the lateral and lengthwise directions, only on the plane perpendicular to the optical axes $OP_R$, $OP_L$, by the frames 32, 36. Note that, when a user holds the binoculars in the usual using situation, the lengthwise direction, which is indicated by the arrow Y in FIG. 1, is approximately coincident with the vertical direction.

Figure 2:
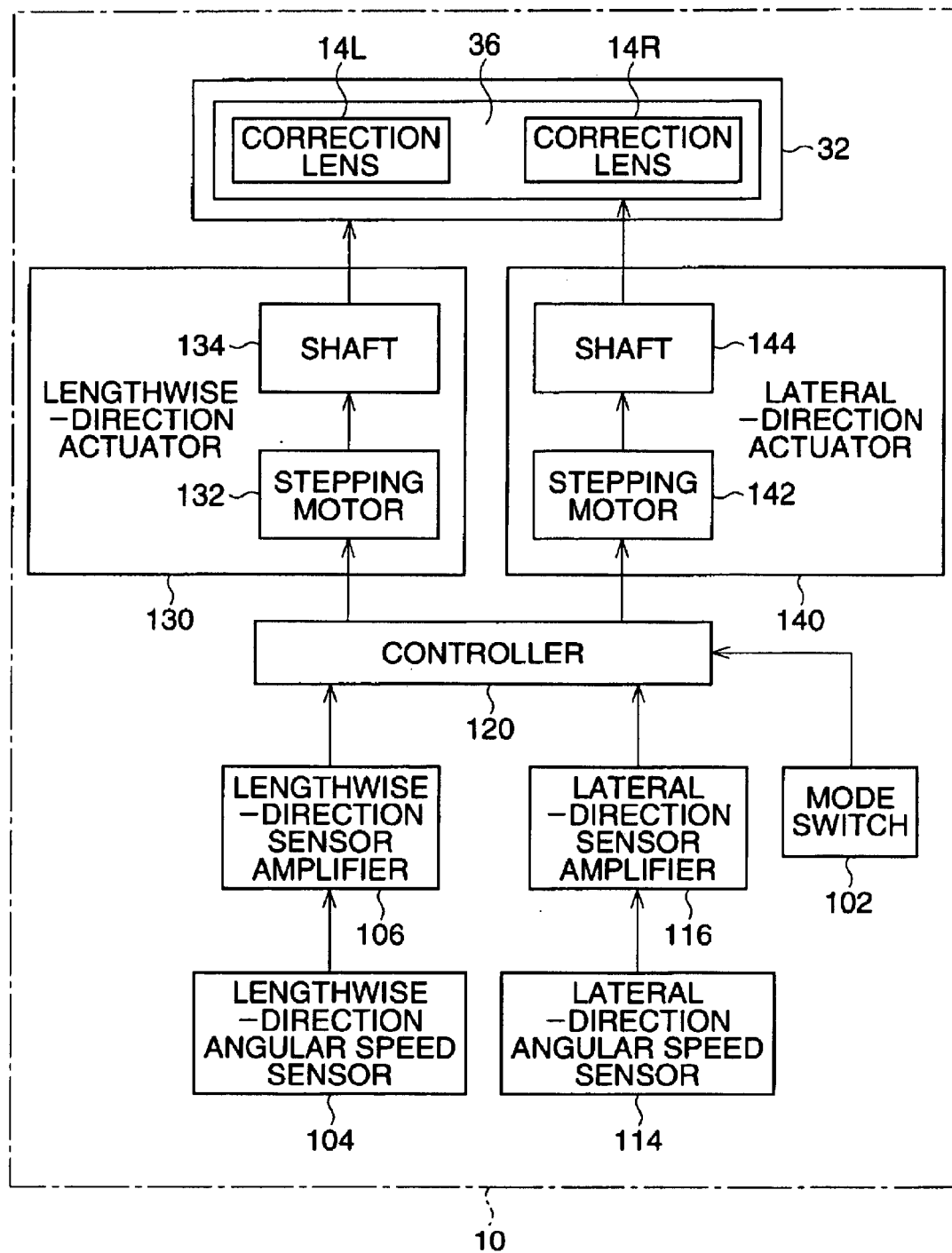
FIG. 2 is a block diagram showing a construction of a focused image tremble correcting mechanism of the optical device shown in FIG. 1.

FIG. 2 is a block diagram of the focused image tremble correcting mechanism. A mode switch 102 is provided on a surface of the body 10. By the mode switch 102, one of usual-observe-mode and tremble-correcting-mode is selected. In the usual-observe-mode, the correction lenses 14R and 14L are positioned at a standard position, so that the optical axis of the correction lens 14R is coincident with the optical axis of the other optical systems 12R, 16R, and 18R, and the optical axis of the correction lens 14L is coincident with the optical axis of the other optical systems 12L, 16L, and 18L. When the mode is switched to the tremble correction mode, if the body 10 is trembled due to, for example a hand tremble, the correction lenses 14R and 14L are moved in the lateral or lengthwise directions in the body 10 such that the tremble of the body 10 is canceled. Accordingly, the user can view an image without tremble, even if the hand tremble occurs.

A lengthwise-direction angular speed sensor 104 and a lateral-direction angular speed sensor 114 are provided in the body 10. When the body 10 is held and the binoculars is trembled by a hand tremble, the direction and angular speed of the hand tremble are detected by the sensors 104 and 114. The angular speed signals corresponding to the directions and the angular speeds of the tremble detected by the sensors 104, 114 are output to a controller 120, after being amplified by a lengthwise-direction sensor amplifier 106 and a lateral-direction sensor amplifier 116. The controller 120 is, for example, a micro computer. The controller 120 converts the angular speed signals to digital values based on a predetermined synchronizing signal, and calculates the amount of angular displacement, due to the hand tremble, in the lengthwise and lateral directions by integrating the digital values.

A lengthwise-direction actuator 130 and a lateral-direction actuator 140 are provided in the body 10. The actuator 130 moves the frame 32 in the lengthwise direction, and the actuator 140 moves the frame 36 in the lateral direction. The actuator 130 includes a stepping motor 132 and a shaft 134 which converts a rotational movement of the stepping motor 132 to a liner movement and transmits the liner movement to the frame 32. A step number and a rotational direction of the stepping motor 132 are controlled by pulse signals output from the controller 120. The pulse signals contain information for moving the frame 32 in the direction opposite to the direction of the hand tremble and by an amount which equals the angular displacement, with respect to the lengthwise direction. Also, the lateral-direction actuator 140 has a structure similar to that of the lengthwise-direction actuator 130, including a stepping motor 142 and a shaft 144. Accordingly, the correction lenses 14L and 14R are moved in the two dimensional directions on the plane perpendicular to the optical axes OPL and OPR, so that the hand tremble is canceled.

Figure 3:
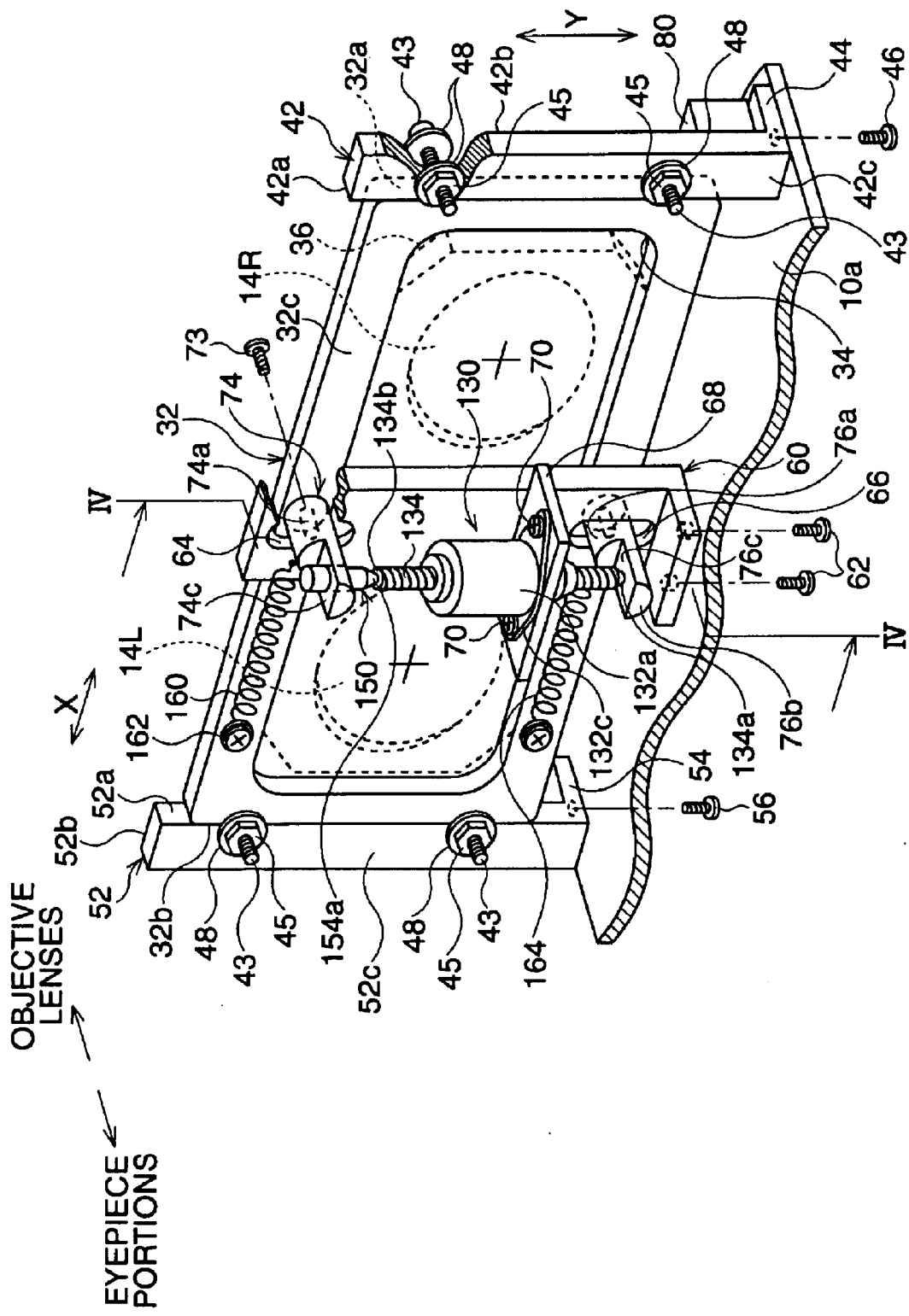
FIG. 3 is a perspective view of a construction around a lengthwise-direction driving frame, viewed from the eyepiece portions, with some portions broken away for clarity.
Figure 4:
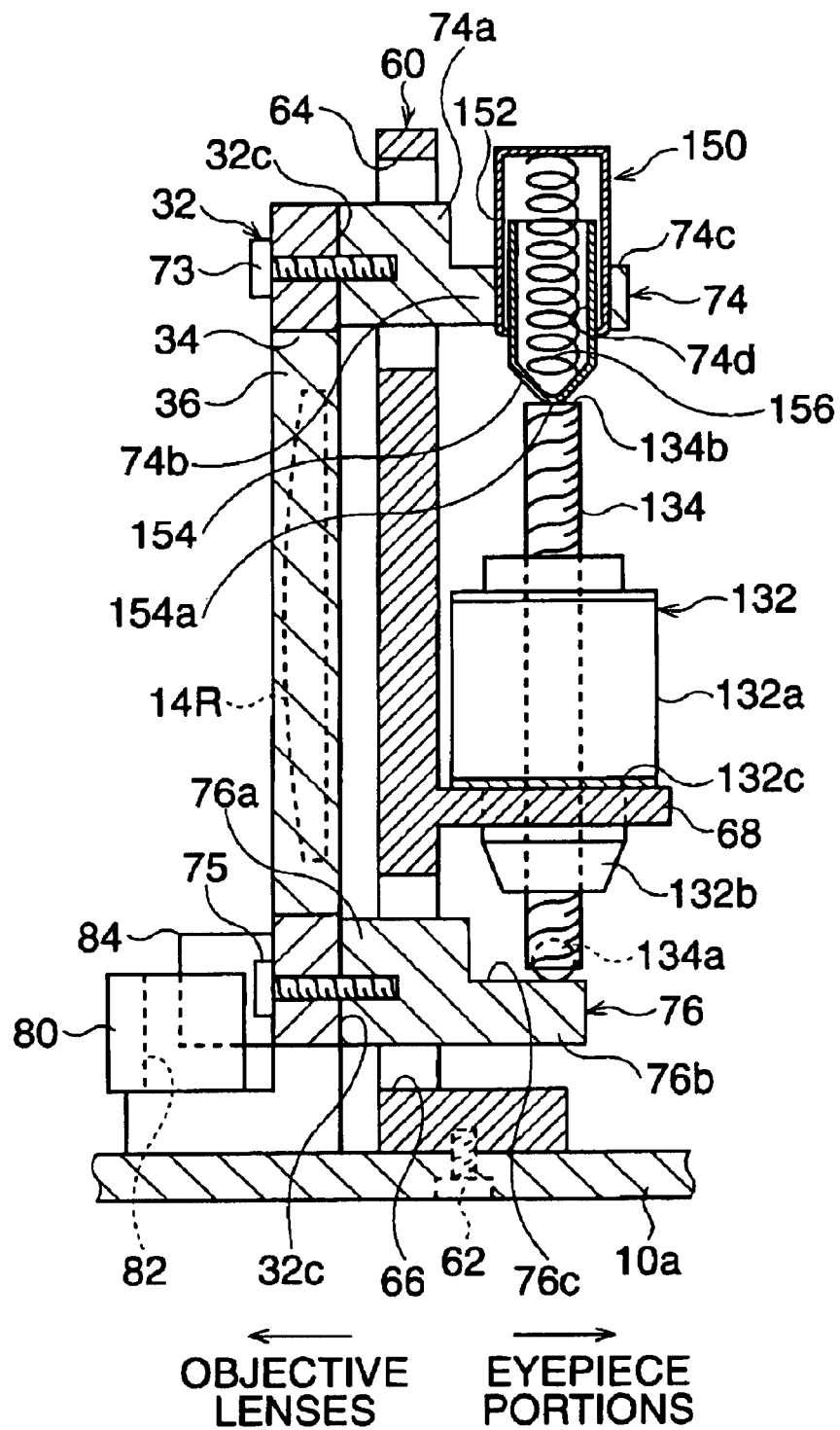
FIG. 4 is a sectional view taken in the direction of the arrows substantially along the line IV—IV of FIG. 3.
Figure 5:
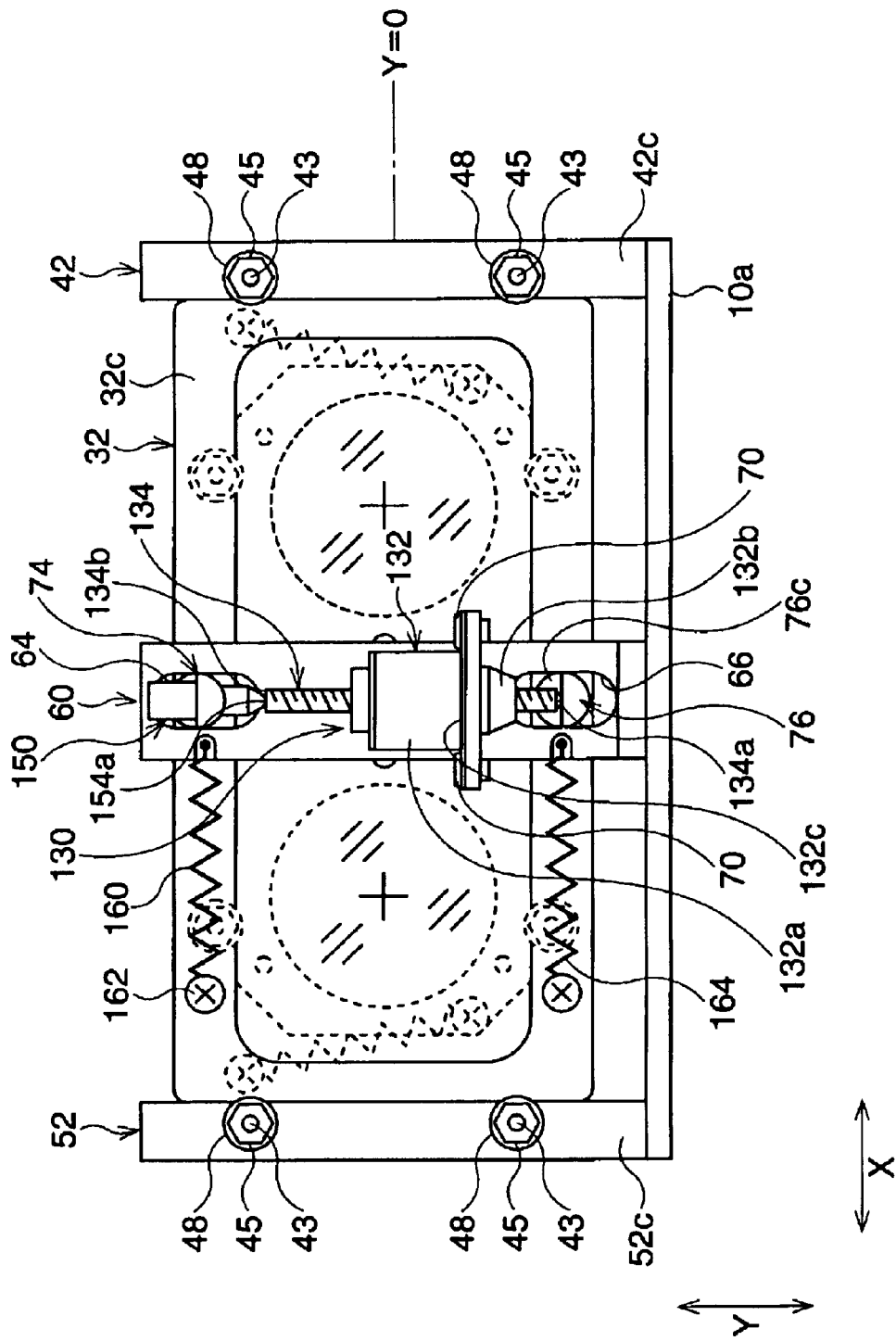
FIG. 5 is a front view of a lengthwise-direction driving mechanism, viewed from the eyepiece portions, when correction lenses are at a standard position.

Referring to FIGS. 3 through 5, the lengthwise-direction driving mechanism including the lengthwise-direction actuator 130 will be explained. FIG. 3 is a perspective view of a construction around the lengthwise-direction driving frame 32, viewed from the eyepiece portions 30R and 30L, with some portions broken away for clarity. FIG. 4 is a sectional view taken in the direction of the arrows substantially along the line IV—IV of FIG. 3. In FIG. 4, the lateral-direction driving mechanism is omitted. FIG. 5 is a front view of the lengthwise-direction driving mechanism, viewed from the eyepiece portions 30R and 30L.

The lengthwise-direction driving frame 32 is a rectangular-shaped plate, which is thick enough to hold the correction lenses 14R and 14L. The frame 32 is made of synthetic resin, for example, to lighten the total weight of the optical device and to facilitate formation. The opening portion 34, which is rectangular, is formed at the center of the frame 32, in order to support the lateral-direction driving frame 36. Four corners of the opening portion 34 are rounded off.

The frame 32 is positioned such that the direction of the thickness is coincident with the optical axes OPR and OPL. The frame 32 is supported by first and second bars 42 and 52 at both ends 32a and 32b thereof in such a manner that the frame 32 is between the two bars 42 and 52. A bottom portion 44 of the first bar 42 is fixed on the inner wall 10a parallel to the optical axes OPR and OPL, by a screw 46, such that the longitudinal axis of the bar 42 is coincident with the lengthwise direction indicated by the arrow Y. Similarly, a bottom portion 54 of the second bar 52 is fixed on the inner wall 10a by a screw 56, such that the longitudinal axis of the bar 52 extends in the lengthwise direction. A side surface 42a of the first bar 42 and a side surface 52a of the second bar 52, facing each other, are parallel. The distance between the side surfaces 42a and 52a substantially equals the length of the frame 32 in the lateral direction. The frame 32 is put between the side surfaces 42a and 52a with a slight clearance, so that the frame 32 is prevented from moving in the lateral direction.

The thickness of the first bar 42 is determined to be slightly thicker than the thickness of the frame 32 such that the frame 32 is smoothly slid without being shaky.

Guide members 48 are fixed on the upper portion of the first bar 42. One guide member 48 is fixed on the objective lens side 42b of the first bar 42, and another guide member 48 is fixed on the eyepiece side 42c of the first bar 42. One portion of each of the guide members 48 extends toward the frame 32, overlapping the frame 32. The guide members 48 are, for example, a pair of washers, which are fixed on the first bar 42 by the head of a bolt 43 which pierces through the first bar 42 and a nut which is engaged with the head of the bolt 43. The first bar 42 is put between the pair of guide members 48. Similarly, another pair of guide members 48 are fixed on the lower portion of the first bar 42. Namely, four guide members 48 are fixed on the first bar 42. Note that, one guide member 48 at the objective lens side 42b of the lower portion of the first bar 42 is omitted in FIG. 3.

Further, two pairs of the guide members 48 are fixed on the second bar 52 in a manner similar to the first bar 42. Namely, four guide members 48 are respectively fixed on the objective lens side 52b and the eyepiece side 52c of the second bar 52. Note that, the guide members 48 at the eyepiece side 52c are depicted and the guide members 48 at the objective lens side 52b are omitted in FIG. 3.

Accordingly, the periphery of the lengthwise-direction driving frame 32 is put between two pairs of guide members 48, at both sides of the first and second bars 42 and 52, so that the frame 32 is prevented from moving in the direction along the optical axes $OP_R$ and $OP_L$.

As described above, the lengthwise-direction driving frame 32 can be moved only in the lengthwise direction by the first and second bars 42 and 52, being kept at a predetermined position in the lateral direction. The correction lenses 14R and 14L, and the lateral-direction driving frame 36 are held by the lengthwise-direction driving frame 32, so that these members are unitarily moved with the frame 32.

A third bar 60 is fixed on the inner wall 10a by two screws 62, at the eyepiece portion side of the frame 32. The third bar 60 is a plate-shaped member, being positioned at the approximately center of the frame 32 in the lateral direction. The width (the length in the lateral direction) of the third bar 60 is determined such that the third bar 60 does not enter into the optical paths of the luminous fluxes passing through the correction lenses 14L and 14R.

Two guide holes 64 and 66 are formed on the third bar 60, being arranged in a line in the lengthwise direction. A pedestal 68 is a plate parallel to the inner wall 10a, and is positioned between the guide holes 64 and 66, projecting to the eyepiece portions.

The lengthwise-direction actuator 130 is fixed on the pedestal 68. The stepping motor 132 includes a motor case 132a and a motor 132b which is mounted in the motor case 132a. One portion of the motor case 132a pierces through the pedestal 68, and a flange 132c having lozenge-shape, extending outward from the outer surface of the motor case 132a, is fixed on the upper surface of the pedestal by two screws 70.

A shaft 134 of the actuator 130 pierces through the motor 132b. The axis of the shaft 134 extends in the lengthwise direction. Male threads are formed on the outer surface of the shaft 134. The shaft 134 is engaged with female threads (omitted in FIG. 4) formed in a shaft bearing of the motor 132b. Namely, the shaft 134 rotatably extends or retracts in the lengthwise direction which is coincident with the axis, in accordance with the rotational direction of the motor 132b.

As described above, the lengthwise-direction actuator 130 is fixed with the inner wall 10a through the pedestal 68, namely the third bar 60, and only the shaft 134 can be moved in the lengthwise direction.

A ball 134a is provided at the tip end of the shaft 134. The ball 134a is abutted against a lower guide pin 76, which is unitarily formed on the lengthwise-direction driving frame 32, from the upper side in FIGS. 3 through 5, pressing the lower guide pin 76. On the other hand, the side surface 134b of another tip end of the shaft 134 is a plane perpendicular to the length wise direction. A pressing member 150 is abutted against the side surface 134b. The pressing member 150 is fixed on an upper guide pin 74 which is unitarily provided on the frame 32. The driving force of the shaft 134 is transmitted to the frame 32 through the two guide pins 74 and 76, and the pressing member 150, so that the frame 32 is moved in the lengthwise direction in accordance with the extension and retraction of the shaft 134.

The lower guide pin 76 is made of rigid material, for example, metal. The base body 76a of the lower guide pin 76 has the sectional shape of a circle, and is fixed on the eyepiece side surface 32c of the frame 32 by a screw 75. The base body 76a extends toward the eyepiece portions along the optical axes, and pierces through the guide hole 66 of the third bar 60. The tip end portion 76b of the lower guide pin 76 projects to the eyepiece portions from the guide hole 66. The tip end portion 76b has a figure obtained by cutting a cylinder, the diameter of which equals the diameter of the base body 76a, along a plane including the axis of the cylinder and removing half portion. Namely, the tip end portion 76b has a sectional shape of semicircle. An upper surface 76c of the tip end portion 76b, which is rectangular, is parallel to the optical axes and the lateral direction. The ball 134a of the shaft 134 is in point-contact with the upper surface 76c.

On the other hand, the upper guide pin 74 is identical to the lower guide pin 76 with respect to the material, the measurement, and the shape. A mounting hole 74d is formed at the tip end portion 74b. The mounting hole 74d, sectional shape of which is circular, pierces through the tip end portion 74b in the lengthwise direction.

The base body 74a of the upper guide pin 74 has a sectional shape of circle, and is fixed on the eyepiece side surface 32c of the frame 32 by a screw 73. The base body 74a extends toward the eyepiece portions along the optical axes, and pierces through the guide hole 64 of the third bar 60. The tip end portion 74b of the upper guide pin 74 projects to the eyepiece portions from the guide hole 64. A spring case 152 of the pressing member 150 is fixed in the mounting hole 74d of the tip end portion 74b.

The spring case 152 has a cylindrical shape and its lower side end portion in FIG. 4 is opened. One portion of a press pin 154 is positioned in the spring case 152. The tip end 154a of the press pin 154 projects from the opening of the spring case 152. The press pin 154 can be moved in the spring case 152, in the lengthwise direction. The base portion of the press pin 154 has a cylindrical shape, the outer diameter of which is slightly smaller than the inner diameter of the spring case 152. The end portion of the press pin 154 has a cone-shaped figure, tapering toward the tip end 154a. The tip end 154a is formed so as to be spherical, and is in point-contact with the side surface 134b of the shaft 134.

The end of the base portion of the press pin 154 is opened. A coil spring 156 is mounted in the space defined by the inner walls of the spring case 152 and the press pin 154, being compressed. The spring case 152 and the press pin 154 are urged by the coil spring 156 so as to be detached. The spring case 152 and the press pin 154 are made of rigid material, for example, metal.

As described above, the spring case 152 is fixed on the lengthwise-direction driving frame 32 by the guide pin 74 and the screw 73. Accordingly, the spring force of the coil spring 156 causes the tip end 154a to press and urge the shaft 134 downward in the vertical direction at a predetermined force. The shaft 134 is supported by the pressing member 150 and the guide pin 76 which are fixed on the frame 32, in such a manner that both ends of the shaft 134 are put between the pressing member 150 and the guide pin 76 at a predetermined urging force. Accordingly, the frame 32 is prevented from being loose with the shaft 134 in the lengthwise direction.

The urging force of the coil spring 156 is determined to be large so that the shaft 134 is not put out from the pressing member 150 and the guide pin 76 by its rotation, and to be small so that a rotational torque is not effected by the urging force. As the shaft 134 is in point-contact with the pressing member 150 and the guide pin 76, the contacting areas are very small. Accordingly, the friction force which is generated due to the rotation of the shaft 134 is prevented from exerting a harmful effect on the rotation torque of the shaft 134, so that the shaft 134 can be smoothly rotated.

In accordance with the rotation of the shaft 134, the upper guide pin 74 is moved in the lengthwise direction, being led by the guide hole 64. As the guide hole 64 is formed to be long and narrow extending in the lengthwise direction, the upper guide pin 74 is allowed to move by a distance corresponding to the longitudinal length of the guide hole 64. The diameter of the base body 74a is set to be slightly smaller than the width (the length in the lateral direction) of the guide hole 64, so that the base body 74a can be slidably and smoothly moved in the guide hole 64.

One end of a supporting coil spring 160 is fixed close to the guide hole 64, and the supporting coil spring 160 is situated extending toward the second bar 52, and another end of the supporting coil spring 160 is fixed on the eyepiece side surface 32c of the frame 32 by a screw 162. The screw 162 is positioned at the upper portion of the correction lens 14L, as shown in FIGS. 3 and 5. The upper guide pin 74 is pulled toward the first bar 42 by the supporting coil spring 160, so that the upper guide pin 74 is kept in contact with the inner wall, which is at the side of the first bar 42, of the guide hole 64. Accordingly, the frame 32 is prevented from being loose by the third bar 60 in the lateral direction.

Similarly, the lower guide pin 76 is moved in the lengthwise direction, being guided by the guide hole 66 which is substantially identical to the guide hole 64 with respect to measure and shape. A supporting coil spring 164 is provided close to the guide hole 66 in order to prevent the base body 76a from being loose in the guide hole 66, namely in order to prevent the frame 32 from being loose with the third bar 60 in the lateral direction.

A relative position of the frame 32 in the lengthwise direction is detected by a lengthwise-direction position sensor 80 (see FIG. 4) which is provided at the objective lens side of the first bar 42. Practically, the sensor 80 detects if the frame 32 is at a lengthwise-direction standard position. As described above, when the optical axes of the correction lenses 14R and 14L are respectively coaxial with the optical axis of the other optical systems of the first and second optical systems 100R and 100L, the correction lenses 14R and 14L are at the standard position. Further, when the frame 32 is at the lengthwise-direction standard position, the optical axes of the correction lenses 14R and 14L lie on a plane perpendicular to the lengthwise direction, which includes the optical axes of the other optical systems of the first and second optical systems 100R, 100L. FIG. 5 shows that the frame 32 is positioned such that the correction lenses 14R, 14L are positioned at the lengthwise-direction standard position.

The position sensor 80 is a transmission-type photo-interrupter, and includes a recess portion 82 which opens toward the frame 32. A light-emitting element and a photo-receptor element (omitted in FIG. 4) are provided in the recess portion 82, in such a manner that these elements face each other. A thin plate 84 is fixed on the frame 32, so as to be able to pass in the recess portion 82 (between the light-emitting element and the photoreceptor element) without contacting these elements. When a light emitted from the light-emitting element is interrupted by the thin plate 84, the output from the position sensor 80 changes. The thin plate 84 is positioned such that when the frame 32 is moved and the correction lenses 14R and 14L are positioned at the lengthwise-direction standard position, the output from the position sensor 80 changes.

Figure 6:
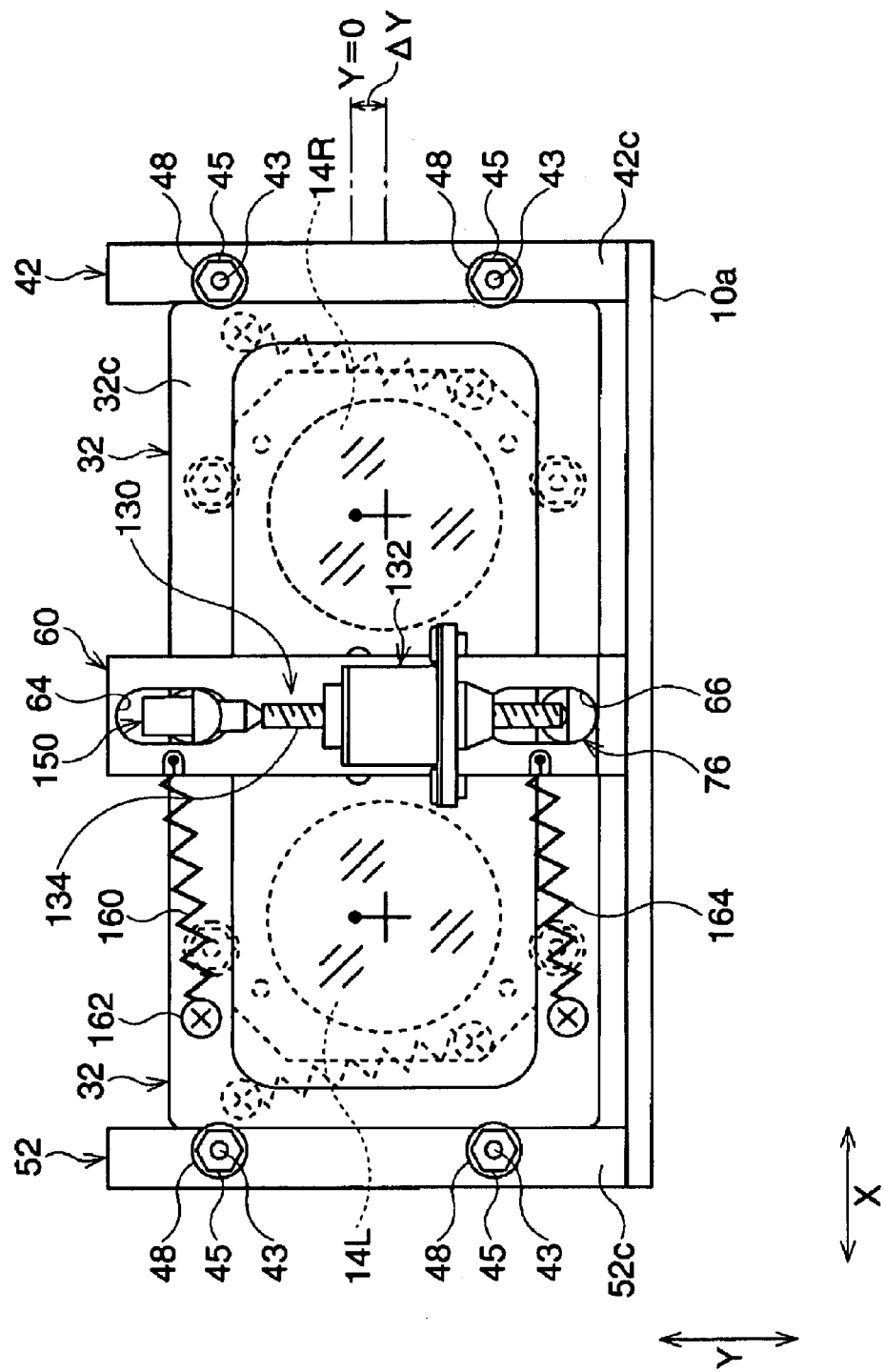
FIG. 6 is a front view of the lengthwise-direction driving mechanism, viewed from the eyepiece portions, when the lengthwise-direction driving frame is moved downward.

FIG. 6 is a front view of the frame 32 viewed from the eyepiece portions 30R and 30L, and shows that the frame 32 was moved downward in FIG. 6. When the frame 32 is positioned as shown in FIG. 5, the stepping motor 132 is rotated in the forward direction and the shaft is extended downward in FIG. 5. Then, the upper guide pin 74 (substantially the pressing member 150) and the lower guide pin 76 follow the movement of the shaft 134. Namely, the upper and lower guide pins 74 and 76 are moved downward, being respectively guided by the guide holes 64 and 66. Accordingly, the frame 32, on which the upper and lower guide pins 74 and 76 are fixed, is moved downward, being guided by the first and second bars 42, 52, and the guide members 48.

As shown in FIG. 6, when the upper and lower guide pins 74 and 76 respectively come in contact with the lower end of the guide holes 64 and 66, the movement of the frame 32 is stopped.

Then, the correction lenses 14R and 14L are at a position lower than the lengthwise-direction standard position (the position indicated by "Y=0") by ΔY.

Figure 7:
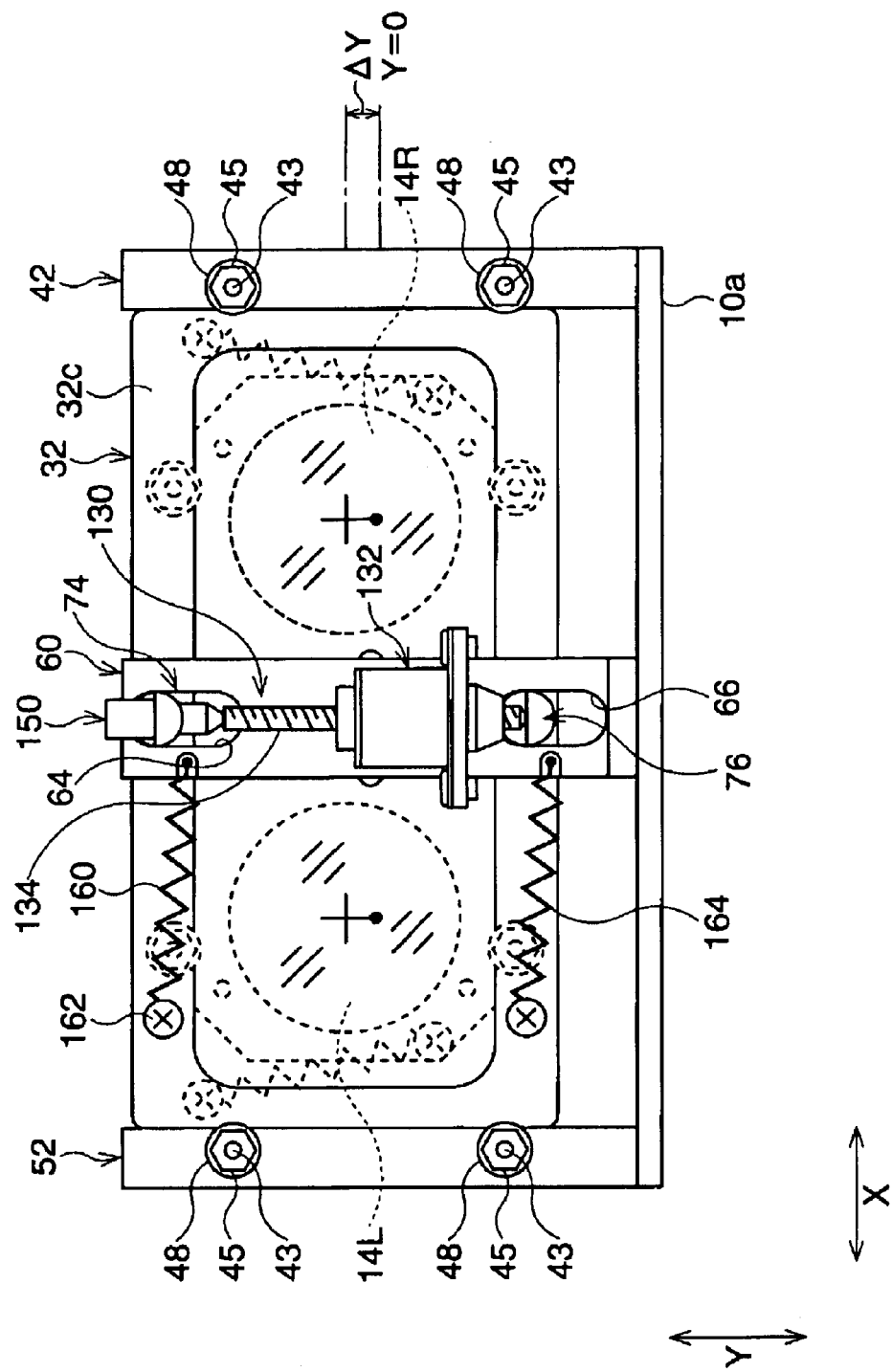
FIG. 7 is a front view of the lengthwise-direction driving mechanism, viewed from the eyepiece portions, when the frame is moved upward.

FIG. 7 is a front view of the frame 32 viewed from the eyepiece portions 30R and 30L, and shows that the frame 32 was moved upward in FIG. 7. When the frame 32 is positioned as shown in FIG. 5, the stepping motor 132 is rotated in the reverse direction and the shaft is retracted upward of FIG. 5. Then, the upper guide pin 74 (substantially the pressing member 150) and the lower guide pin 76 follow the movement of the shaft 134. Namely, the upper and lower guide pins 74 and 76 are moved upward, being respectively guided by the guide holes 64 and 66. Accordingly, the frame 32, on which the upper and lower guide pins 74 and 76 are fixed, is moved upward, being guided by the first and second bars 42 and 52, and the guide members 48. As shown in FIG. 7, when the upper and lower guide pins 74 and 76 respectively come in contact with the upper end of the guide holes 64 and 66, the movement of the frame 32 is stopped. Then, the correction lenses 14R and 14L are at a position above the lengthwise-direction standard position (the position indicated by "Y=0") by ΔY.

As described above, with respect to the lengthwise direction, the frame 32 can be moved by an amount similar to an amount (two times of ΔY) by which the guide pins 74 and 76 can move in the guide holes 64 and 66.

Figure 8:
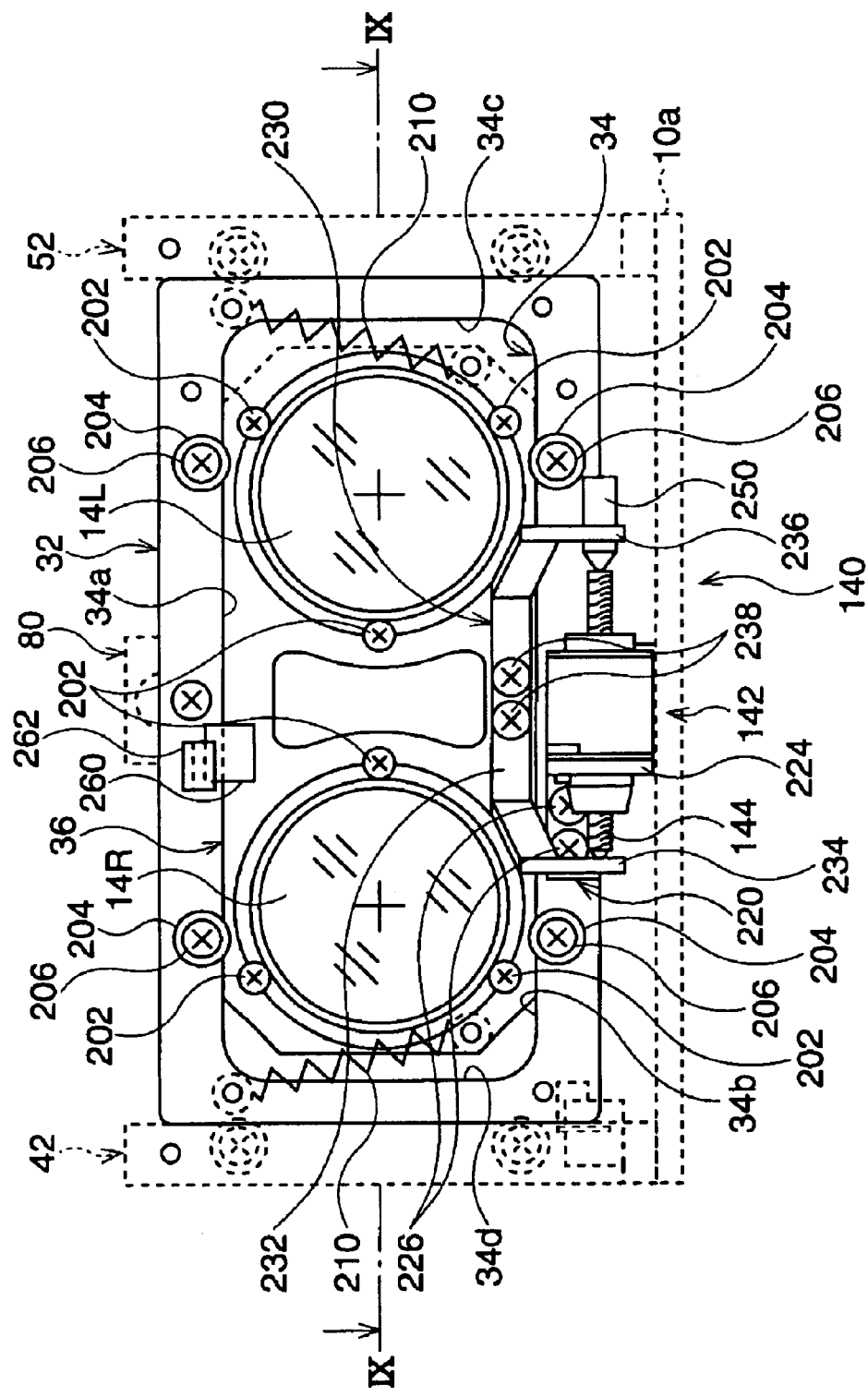
FIG. 8 is a front view of a lateral-direction driving mechanism, viewed from objective lenses.
Figure 9:
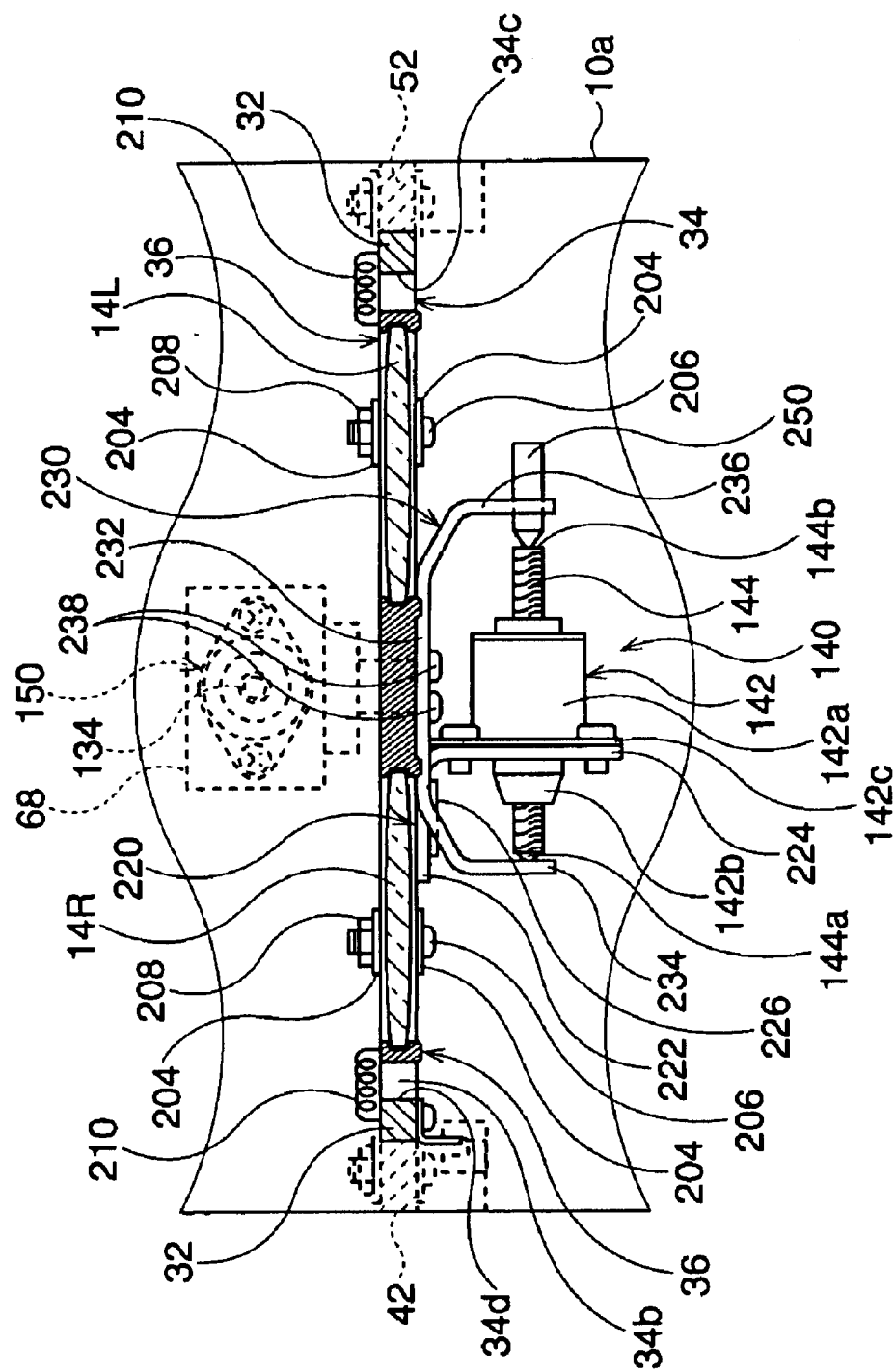
FIG. 9 is a sectional view taken in the direction of the arrows substantially along the line IX—IX of FIG. 8.

Next, referring to FIGS. 8 and 9, the lateral-direction driving mechanism including the lateral-direction actuator 140 will be explained. FIG. 8 is a front view of the lateral-direction driving mechanism, viewed from the objective lenses 12R and 12L, and FIG. 9 is a sectional view taken in the direction of the arrows substantially along the line IX—IX of FIG. 8. Note that, other structures except for the lateral-direction driving mechanism are depicted with broken lines, in FIGS. 8 and 9.

As described above, the opening portion 34 has a rectangular-shape. An upper inner wall 34a and a lower inner wall 34b, which face each other, are parallel, and a right inner wall 34c and a left inner wall 34d, which face each other, are parallel.

The lateral-direction driving frame 36, which is plate-shaped and held in the opening portion 34, is made of, for example, synthetic resin. With respect to the lengthwise direction, the length of the frame 36 substantially equals the length of the opening portion 34, and with respect to the lateral direction, the length of the frame 36 is shorter than the length of the opening portion 34. The thickness of the frame 36 is determined to be slightly thinner than the thickness of the frame 32 such that the frame 36 is smoothly slid without being shaky. Accordingly, the position of the frame 36 in the lengthwise direction is determined in accordance with the movement of the frame 32.

Four washers 204, which are ring-shaped, are provided on each of the objective lens side surface and the eyepiece portion side surface of the lengthwise-direction frame 32. Namely, eight washers 204 are provided on the frame 32. As shown in FIG. 9, two washers 204 are fixed by a bolt 206 and a nut 208, as one pair, in such a manner that the frame 32 is put between a pair of washers 204. At a portion close to the upper inner wall 34a, of the frame 32, two pairs of washers 204 are provided, being arranged in a line parallel to the lateral direction. Similarly, at a portion close to the lower inner wall 34b, of the frame 32, the other two pairs of washers 204 are provided, being arranged in a line parallel to the lateral direction. As shown in FIG. 8, one portion of each of washers extends toward the frame 36, overlapping the frame 36. Namely, the periphery of the frame 36 is put between two washers 204 at four portions, so that the frame 36 is prevented from moving away from the frame 32 in the direction along the optical axes $OP_R$, $OP_L$.

As described above, the movement of the lateral-direction driving frame 36 is restricted in the lengthwise direction and in the direction along the optical axes $OP_R$, $OP_L$, independently of the movement of the lengthwise-direction driving frame 32, and can be moved only in the lateral direction. Four corners of the frame 36 are cut so as not to come in contact with the corresponding rounded corner of the opening portion 34. The correction lenses 14R and 14L are engaged with the frame 36, and are respectively fixed to the frame 36 by three screws 202. Accordingly, the correction lenses 14R and 14L are moved in accordance with the movement of the frame 36 in the lateral direction, in the body 10.

There is a slight clearance, between the frame 36 and the upper inner wall 34a, and between the frame 36 and the lower inner wall 34b, in order to make the slidable movement of the frames 32 and 36 smooth. Further, the frame 36 is pulled upward in FIG. 8 by two supporting coil springs 210, so that the frame 36 is in contact with the upper inner wall 34a at all times. Accordingly, shaking due to the clearances is avoided for the frame 36. One of ends of the supporting coil springs 210 is fixed to a corner of the lower portion of the frame 36, and the other end of the supporting coil springs 210 is fixed to the corner of the upper portion of the frame 32.

The lateral-direction actuator 140 is mounted on the objective lens side of the lengthwise-direction driving frame 32 by a mounting member 220. The lateral-direction actuator 140 has a construction similar to that of the lengthwise-direction actuator 130. The reference numeral of each element of the actuator 140 equals ten plus the numeral of the corresponding element of the actuator 130. A detailed explanation of the actuator 140 is omitted.

The mounting member 220 is fixed on the frame 32, at the lower side of the lower inner wall 34b. The mounting member 220 includes two plane portions 222 and 224 which are perpendicular to each other. The first plane portion 222 is fixed on the frame 32 by two screws 226 so as to be parallel to the frame 32. The second plane portion 224 is unitarily formed at the side end of the first plane portion 222, which is close to the center of the frame 32, and extends toward the objective lens side, being perpendicular to the first plane portion 222. The flange 142c of the lateral-direction actuator 140 is fixed on the second plane portion 224 by screws, so that the actuator 140 is positioned at approximately the center portion of the frame 32 in the lateral direction, and the axis of the shaft 144 is parallel to the lateral direction.

As described above, the lateral-direction actuator 140 is supported by only the lengthwise-direction driving frame 32, and only the shaft 144 is moved in the lateral direction.

A holding member 230 is fixed on the lateral-direction driving frame 36, at the objective lens side. The sectional shape of the holding member 230 is approximately a U figure. The holding member 230 includes two arm portions 234 and 236. The shaft 144 is supported by the arm portions 234 and 236 in such a manner that both sides of the shaft 144 are located between the arm portions 234 and 236. Further, the holding member 230 includes a fixing board portion 232 which is fixed on the lateral-direction driving frame 36, at the lower side in FIG. 8 and between the correction lenses 14R and 14L. The longitudinal axis of the fixing board portion 232 extends in the lateral direction. At both sides of the fixing board portion 232, the arm portions 234 and 236 extend toward the objective lens side. The portions facing the ends of the shaft 144, of the arm portions 234 and 236, have a plane figure perpendicular to the lateral direction.

A ball 144a provided at the tip end of the shaft 144 is abutted against the arm portion 234 at the left side from the right side, in FIGS. 8 and 9. The pressing member 250 is fixed on the arm portion 236 at the right side in FIGS. 8 and 9, and the tip end of the pressing member 250 is abutted against the base end 144b of the shaft 144.

The pressing member 250 has a structure and a function similar to those of the pressing member 150 utilized in the lengthwise-direction driving mechanism. The coil spring (omitted in FIGS. 8 and 9), provided in the pressing member 250, presses the shaft 144 to the arm portion 234 by a predetermined urging force. Accordingly, the lateral-direction driving frame 36 is moved in the lateral direction in accordance with the extension and retraction of the shaft 144. The distance, at which the frame 36 can be moved in the lateral direction, corresponds to the length obtained by subtracting the lateral-direction length of the frame 36 from the lateral-direction length of the opening portion 34.

A thin plate 260 is provided on the frame 36, and a lateral-direction position sensor 262, which detects the position of the thin plate 260, is provided on the frame 32. A structure and a function of the thin plate 260 and the sensor 262 are similar to those of the thin plate 84 and the lengthwise-direction position sensor 80. In FIGS. 8 and 9, the frame 36 is at a lateral-direction standard position. Note that, when the frame 36 is at the lateral-direction standard position, the optical axis of the correction lenses 14R lies on a plane parallel to the lengthwise direction, which includes the optical axis of the other optical systems of the first optical system 100R, and the optical axis of the correction lenses 14L lies on a plane parallel to the lengthwise direction, which includes the optical axis of the other optical systems of the second optical system 100L.

As described above, the correction lenses 14R and 14L can be moved in the lengthwise and lateral directions on the plane perpendicular to the optical axes, by the lengthwise-direction and lateral-direction driving mechanisms. The shaft 134 of the lengthwise-direction actuator 130 is supported by the lengthwise-direction driving frame 32, in such a manner that no substantial space exists between both ends of the shaft 134 and the actuator 130. Also, the shaft 144 of the lateral-direction actuator 140 is supported by the lateral-direction driving frame 36, in such a manner that no substantial space exists between both ends of the shaft 144 and the actuator 140. Accordingly, the driving forces of the shafts 134 and 144 are transmitted to the frames 32 and 36.

Conventionally, for example, in the lengthwise-direction driving mechanism, the shaft 134 is not supported at both ends by members provided on the frame 32. In order to position the frame 32, the frame 32 is pulled upward by coil springs, and a pressed member (corresponding to the guide pin 76) unitarily formed on the frame 32 is pressed to the tip end of the shaft 134 by the urging force of the coil springs.

In such a mechanism, in order to move the frame 32 downward by the shaft 134, it is necessary to press the pressing member by a driving force stronger than the urging force of the coil springs. When the binoculars are held in a usual position, the frame 32 is pressed downward by the weight of the frame 32 and the weight of the lateral-direction driving mechanism (the lateral-direction driving frame 36, the lateral-direction actuator 140, and so on), and the correction lenses 14R and 14L. Namely, the frame 32 can be moved by a driving force, the value of which exceeds a value obtained by subtracting the above-mentioned weights from the urging force of the coil springs. Accordingly, the driving force of the motor 132 is set to a value exceeding the value obtained by subtracting the above-mentioned weights from the urging force of the coil springs.

However, the direction in which the frame 32 is moved when the shaft 134 extracts and presses the frame 32, (corresponding to the downward direction of FIGS. 3 through 5), does not always correspond to the vertical direction. The direction, in which the frame 32 is moved when the shaft 134 extracts and presses the frame 32, is dependent on the manner in which the user holds the binoculars and the position of the user. For example, if a user holds the binoculars upside down, the direction in which the frame 32 is moved when the shaft 134 retracts and is urged by the coil spring, (corresponding to the upward direction of FIGS. 3 through 5), corresponds to the vertical direction.

In this case, the force, which corresponds to the total force of the urging force of the coil spring and the weights of the frame 32, the lateral-direction driving mechanism, and the correction lenses 14R and 14L is added to the shaft 134. Accordingly, if the driving force of the motor 132 is set as described above, the force added to the shaft 134 (corresponding to the upward force in FIGS. 3 through 5) is larger than the driving force for extracting the shaft 134 (corresponding to the downward force in FIGS. 3 through 5), causing the motor 132 to pull out.

However, in the first embodiment, in stead of the coil springs, the guide pins 74 and 76 which are made of rigid material and the pressing member 150 are utilized to support the shaft 134 at both its ends. Accordingly, the frame 32 and the lateral-direction driving mechanism are stably supported by the shaft at all times, and the force added to the shaft is kept at a predetermined level, independently of the position of the binoculars. Namely, the binoculars, to which the first embodiment is applied, have an advantage that pull out of the motor 132 never occurs no matter how the binoculars are held. Further, when compared with the conventional driving mechanism, the load on the motor 132 is reduced, so that a smaller motor, the torque of which is lower, can be used in the driving mechanism. Furthermore, the shaft 134 is in point-contact with the guide pin 74 and the pressing member 150. Accordingly, the friction generated between these members is so small that the rotation of the shaft 134 is not affected.

Note that, the construction of a pressing member is not limited to the construction shown in the first embodiment which includes the coil case 152, the press pin 154, and the coil spring 156. Other structures, in which the side surface 134b of the shaft 134 is in point-contact with a tip end of a member, and is pressed by the member at a predetermined force, may be utilized.

Figure 10:
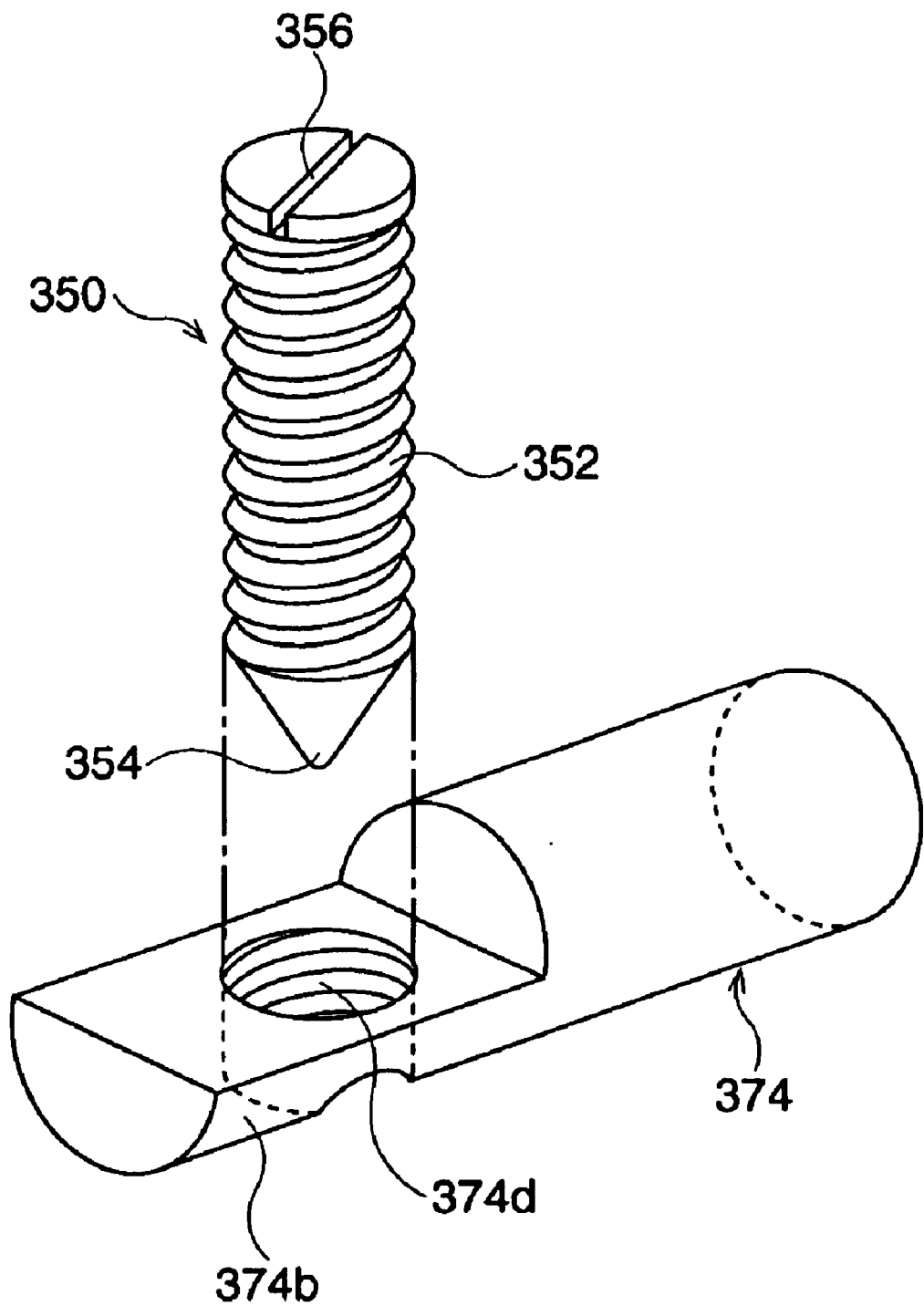
FIG. 10 is another example of the pressing member of the optical device provided with the focused image tremble correcting function, to which a second embodiment according to the present invention is applied.

FIG. 10 shows a second embodiment according to the present invention. It is a perspective view of another example of the pressing member. Note that, other structures of the driving mechanisms are similar to those of the first embodiment, and are omitted in FIG. 10, and the explanation will be omitted.

A pressing member 350 is a set screw. Male threads 352 are formed on the outer surface of a cylindrical portion of the pressing member 350. One end portion of the cylindrical portion has a cone-shaped figure, tapering toward the tip end 354. The tip end 354 is formed so as to be spherical. A slit 356 for a screwdriver is formed on the side surface of another end portion. Female threads 374d are formed at the tip end 374b of a guide pin 374. The pressing member 350 is mounted on the guide pin 374, by engaging the male threads 352 and the female threads 374d.

Note that, a special screwdriver, for example, a torque screwdriver, by which engagement can be carried out while confirming its torque value, is utilized for mounting the pressing member 350. An amount by which the tip end 354 projects from the guide pin 374, in other words, the pressing force against the shaft 134, is adjusted to be an appropriate value by using the torque screwdriver. The appropriate pressing force is a force under which the shaft 134 freely rotates and is not pushed away from the guide pin (omitted in FIG. 10) and the pressing member 350.

Figure 11:
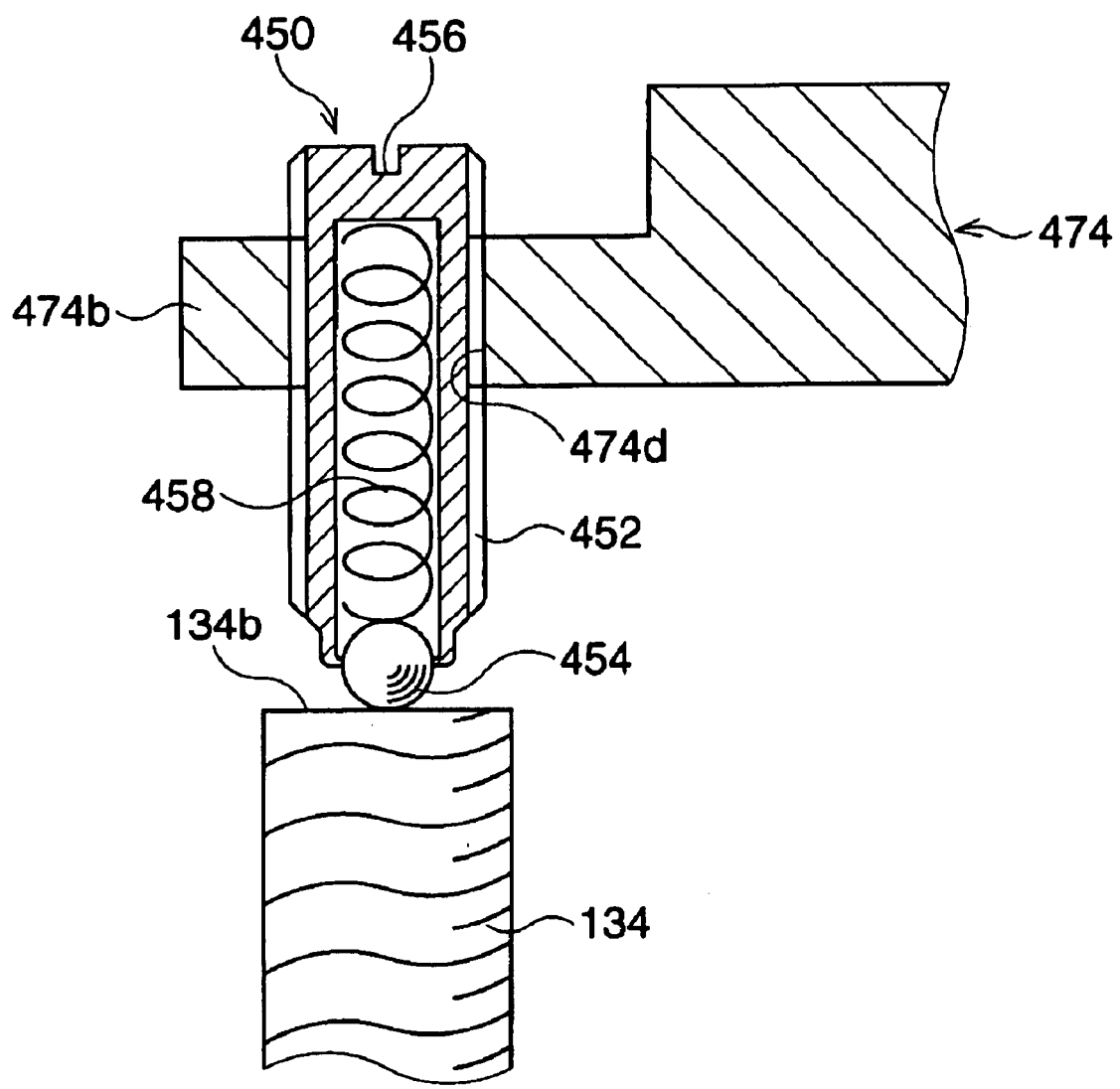
FIG. 11 is another example of the pressing member of the optical device provided with the focused image tremble correcting function, to which a third embodiment according to the present invention is applied.

FIG. 11 shows a third embodiment according to the present invention. It is a sectional view of another example of the pressing member. A pressing member 450 is a plunger. A ball 454 is provided at the end of the pressing member 450. A coil spring 458 is provided for urging the ball 454 in the direction in which the ball 454 is projected to the outside of the pressing member 450. Other structures are similar to those of the pressing member 350 of the second embodiment, including male threads 452 and female threads 474d.

The urging force, which is added to the shaft 134 by the pressing member 450, is predetermined in accordance with the projecting amount of the ball 454. The projecting amount of the ball 454 can be confirmed by sight. On the other hand, in the second embodiment, the urging force of the pressing member 350 should be confirmed using the torque screwdriver in the slit 356. However, in the third embodiment, it is unnecessary to use the special screwdriver in the slit 456, and a normal screwdriver can be used for the purpose of adjusting the engagement of the pressing member 450 and the tip end 474b of the guide pin 474.

Similar to the first embodiment, in both of the second and third embodiments, the side surface 134b is in point-contact with the pressing members 340 and 450. Namely, the friction between the shaft 134 and the pressing members 340 and 450 is so low that the rotation of the shaft 134 is not interrupted.

In the above-mentioned embodiments, the tip end of the member which is included in the pressing member is formed to be spherical, and the side surface of the shaft is formed to be plane. However, the figures of the tip end of the member which is included in the pressing member and the side surface of the shaft can be switched. Further, the figures of the other tip end of the shaft and the guide pin can be switched.

Note that, the explanation given in this specification is for binoculars including a pair of optical systems, however, the above-mentioned driving mechanism can be used in other optical devices, for example, a telescope, still camera, video camera, and so on. Further, the motor is not limited to the stepping motor. Other driving mechanisms, in which the shaft extends and retracts in accordance with the rotation of the motor, can be utilized. Note that, if another driving mechanism without a stepping motor is utilized, it is necessary to prepare an extra mechanism which controls the positioning of the shaft along its axis.

Further, note that, the explanation here is given mainly with respect to the lengthwise direction, and a similar explanation is applicable to the lateral direction.

As described above, in an optical device with a correcting function for a tremble of a focused image, according to the present invention, the shaft of the actuator for moving the correction lens is supported at both ends by rigid members, so that the optical device has the advantages that: the positioning of the shaft is accurate; and the effect of gravity in accordance with the position of the optical device does not affect the motor, and the load added to the motor does not change, so that the pull out of the motor does not occur.

Further, the present invention has another advantage in that, a small motor, the torque of which is low, can be utilized whereby the consumption of electricity is reduced and the optical device is lightened.

The present disclosure relates to subject matter contained in Japanese Patent Application No. 2001-003609 (filed on Jan. 11, 2001) which is expressly incorporated herein, by reference, in its entirety.

What is claimed is:

1. A correcting device for correcting a tremble of a focused image comprises:
    a correction optical system for correcting a tremble of an optical axis in an optical device;
    a driving frame, holding said correction optical system, that can be moved in a predetermined direction on a plane perpendicular to said optical axis;
    a driving mechanism that includes a shaft having a central axis which is parallel to said predetermined direction, said shaft being linearly driven shaft along said central axis; and
    a transmitting mechanism that engages both ends of said shaft in order to transmit the linear movement of said driven shaft to said driving frame, said transmitting mechanism including two projecting portions that project from said driving frame along said optical axis so as to face the corresponding ends of said shaft, and a pressing member, provided on at least one of said two projecting portions, that causes said shaft to be engaged at both ends by pressing said shaft against the other of said two projecting portions.

2. A correcting device according to claim 1; wherein said predetermined direction corresponds to the vertical direction.

3. A correcting device according to claim 1, further comprises two guide holes, the longitudinal axis of which extends in said predetermined direction, and said two projecting portions are respectively moved in said two guide holes, whereby said driving frame is guided during movement in said predetermined direction.

4. A correcting device according to claim 1, wherein said driving mechanism includes a motor and a screw feeder mechanism that transmits the rotation of said motor to said shaft, and when said shaft is moved linearly by rotation of said screw feeder mechanism, said ends of said shaft are in point-contact with said transmitting mechanism.

5. A correcting device according to claim 1, wherein said pressing member includes:
    a case that is fixed on one of said projecting portions;
    a press pin that can be moved along the central axis of said shaft in said case; and
    a coil spring provided in said case, that urges said press pin along the central axis of said shaft,
    the tip end of said press pin being spherical and in contact with one end of said shaft at all times.

6. A correcting device according to claim 1, wherein said pressing member is a set screw fixed on one of said projecting portions, a tip end of said set screw being spherical, said tip end being in point-contact with one end of said shaft and pressing said shaft along the axis of said shaft.

7. A correcting device according to claim 1, wherein said pressing member is a plunger fixed on one of said projecting portion, said plunger including: a ball that is provided at a tip end of said plunger; a coil spring that urges said ball along the axis of said shaft.

8. A correcting device according to claim 1, wherein one of said ends of said shaft is spherical, and a plane portion perpendicular to the axis of said shaft is formed on one of said projecting portions, and said spherical end of said shaft is in contact with said plane portion at all times.

9. An optical device comprising a correction mechanism for correcting a tremble of a focused image, said correction mechanism correcting a tremble of an optical axis of said optical device by moving a correction optical system in a first and a second direction which cross at right angles on a plane perpendicular to said optical axis,
    wherein said correction mechanism comprises:
        a first driving frame which can be moved in said first direction, and on which an opening portion is formed;
        a first driving mechanism which includes a first shaft parallel to said first direction, said first shaft being linearly driven along its axis;
        a first transmitting mechanism which engages said first shaft at both ends of said first shaft, said first transmitting mechanism being fixed on said first driving frame, whereby a linear movement of said first shaft is transmitted to said first driving frame;
        a second driving frame which can be moved in said second direction and holds said correction optical system;
        a second driving mechanism which includes a second shaft parallel to said second direction, said second shaft being linearly driven along its axis; and
    a second transmitting mechanism which engages said second shaft at both ends of said second shaft, said second transmitting mechanism being fixed on said second driving frame, whereby a linear movement of said second shaft is transmitted to said second driving frame,
    said second driving frame, said second driving mechanism, and said second transmitting mechanism being supported by said first driving frame.

* * * * *